United States Patent [19]

Walsh et al.

[11] Patent Number: 5,349,988
[45] Date of Patent: Sep. 27, 1994

[54] CORREGATED REFRIGERATION HOSE SYSTEM

[75] Inventors: Brian J. Walsh; Robert M. Lefere, both of Jackson, Mich.

[73] Assignee: Aeroquip Corporation, Jackson, Mich.

[21] Appl. No.: 716,092

[22] Filed: Jun. 17, 1991

[51] Int. Cl.$^5$ ............................................. F16L 11/04
[52] U.S. Cl. ................................... 138/107; 138/121; 138/125; 138/137
[58] Field of Search ............... 138/109, 121, 122, 173, 138/125, 126, 110; 285/258, 257, 149; 135/137

[56] References Cited

U.S. PATENT DOCUMENTS

| | | | |
|---|---|---|---|
| 3,580,289 | 5/1971 | James, Jr. | 138/123 |
| 4,303,457 | 12/1981 | Johansen et al. | 138/123 |
| 4,366,841 | 1/1983 | Currie et al. | 138/109 |
| 4,905,735 | 3/1990 | Akiyoshi | 138/125 |
| 4,905,736 | 3/1990 | Kitami et al. | 138/125 |
| 5,037,143 | 8/1991 | Sanders et al. | 138/121 |
| 5,129,428 | 7/1992 | Winter et al. | 138/148 |
| 5,129,429 | 7/1992 | Winter et al. | 138/122 |
| 5,129,686 | 7/1992 | Sanders et al. | 138/121 |
| 5,148,836 | 9/1992 | Lawrence | 138/109 |

Primary Examiner—Timothy F. Simone
Assistant Examiner—Patrick Brinson
Attorney, Agent, or Firm—Beaman & Beaman

[57] ABSTRACT

A multiple layer hose and fitting assembly for refrigeration circuits particularly suitable for larger sizes of refrigeration conduit wherein refrigerant loss to the atmosphere through the hose material is minimized and flexibility is maintained. An inner tube of thermoplastic material is employed to minimize refrigerant loss due to permeation, and the inner tube is corrugated to provide lateral flexibility. The hose includes pressure reinforcing layers or covers, and a moisture ingression resistant sheath or layer circumscribes the inner tube to protect the inner tube from contamination by moisture. In the preferred embodiment the sheath is located between a braided reinforcing layer engaging the inner tube and a braided cover. The moisture ingression resistant layer is preferably formed of a thermoplastic rubber, and the adjacent hose layers are capable of limited axial displacement relative to each other to assure lateral flexibility. The hose utilizes fittings which include a serrated socket to aid in fitting retention, and sealing rings or a tubular insert cooperating with the hose corrugations may be employed to augment fitting sealing.

11 Claims, 4 Drawing Sheets

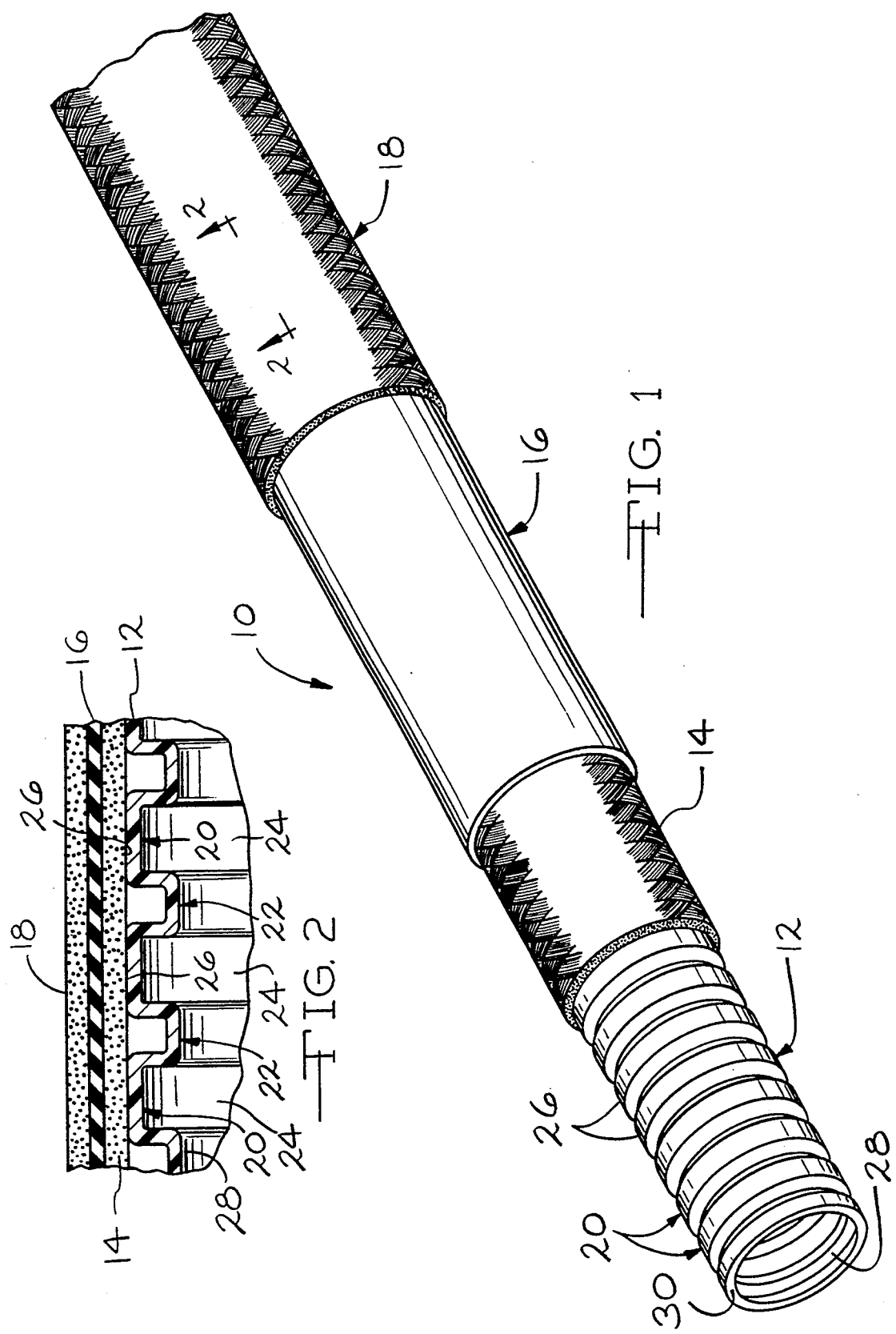

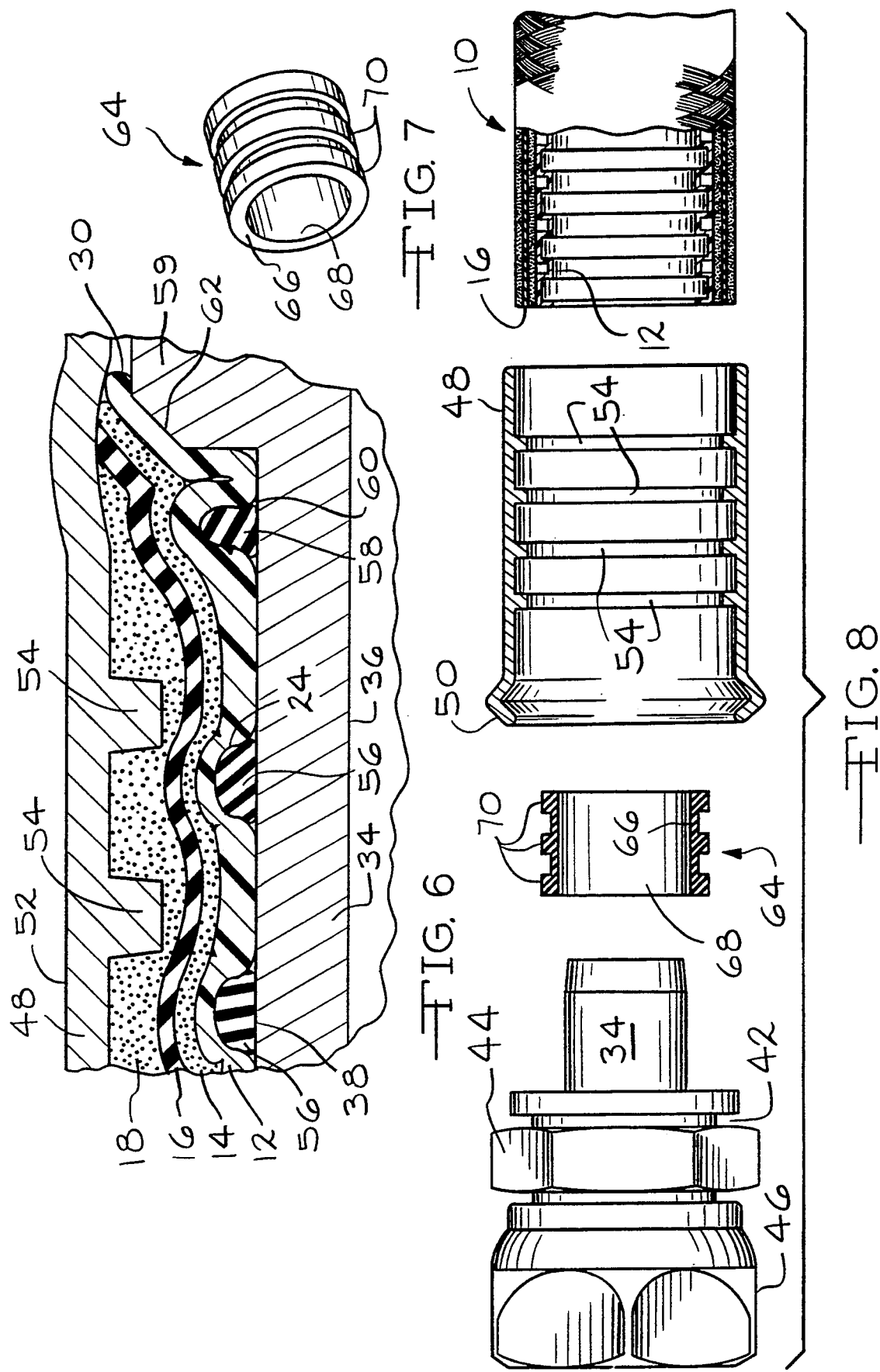

CORREGATED REFRIGERATION HOSE SYSTEM

BACKGROUND OF THE INVENTION

Refrigeration and air conditioning hose is employed to transfer refrigerant between the various refrigeration circuit components. With smaller sizes of refrigeration circuits, such as used with residential and automobile air conditioning systems relatively small diameter flexible refrigerant hose may be used wherein the hose includes an inner tube formed of a thermoplastic material, such as nylon, which minimizes permeation of the refrigerant gas. However, because thermoplastic inner tubes of larger diameter, such as above ¾ inch ID, are relatively stiff and do not readily deform or bend, nylon refrigerant hose inner tubes are not commonly employed with such larger diameter refrigerant hose as used in industrial applications, and with air conditioning systems for buses and trucks. Accordingly, with higher capacity refrigeration circuits pre-formed metal conduit is usually employed, necessitating higher costs and requiring skilled installation as compared to circuits employing flexible conduit of smaller size. If larger flexible diameter refrigeration hose assemblies are required rubber is normally employed as the hose inner tube material to provide the desired flexibility, but rubber is permeated by refrigerant gases and the gases will slowly escape to the atmosphere creating an undesirable environmental hazard and require frequent circuit recharging. Presently, refrigerant hose of larger diameter having a highly flexible inner tube formed of a low refrigerant permeability material is not available for refrigeration circuits.

It is known to improve the flexibility characteristics of flexible hose by using a corrugated inner tube construction, such as shown in the assignee's U.S. Pat. No. 4,758,029. Hose having an inner tube formed of corrugations is capable of excellent lateral flexibility without kinking or collapse. However, in order to achieve the desired resistance to internal pressures, abrasion, and the like corrugated hose inner tubes are usually surrounded by protective covers or braided pressure resistant layers which are bonded to each other by vulcanizing, adhesives, or the like. The bonding of adjacent hose layers detracts from the lateral flexibility of the hose as relative axial displacement between adjacent hose layers is not permitted and the advantages achieved by the inner corrugated tube are, to some extent, negated.

While it has been appreciated that thermoplastics, such as nylon, have low permeability when conveying refrigeration gases, such materials when used as a refrigeration conduit inner tube have the disadvantage of being adversely affected by moisture from the atmosphere, and this characteristic of nylon has detracted from its use in refrigeration circuits in that refrigeration circuits are particularly susceptible to moisture contamination.

OBJECTS OF THE INVENTION

It is an object of the invention to provide a refrigeration hose system which permits larger sizes of refrigeration hose to be constructed having excellent flexibility characteristics and wherein the hose has low refrigerant gas permeation and low moisture ingression.

A further object of the invention is to provide a multi-layered refrigeration hose system employing a hose having a plurality of superimposed layers having different physical characteristics and purpose, adjacent layers being free of firm bonding permitting adjacent layers limited relative axial displacement to achieve a high degree of hose lateral flexibility.

An additional object of the invention is to provide a flexible refrigeration hose system of relatively large hose size having an inner corrugated tube to assure lateral flexibility, and wherein a moisture ingression resistance tube circumscribes the inner tube to prevent inner tube moisture contamination, and pressure resistance and abrasion resistance layers also constitute a part of the hose fabrication.

A further object of the invention is to provide a flexible refrigeration hose system utilizing a corrugated inner tube and an end fitting having a nipple received within the hose inner tube wherein efficient sealing between the hose and fitting is achieved and effective fitting retention is provided.

An additional object of the invention is to provide a refrigerant hose system utilizing a flexible corrugated inner tube of low gas permeability and employing a sealing insert between the fitting nipple and inner tube wherein a smooth nipple may effectively seal to the corrugated inner tube.

SUMMARY OF THE INVENTION

A corrugated refrigeration hose system in accord with the invention utilizes a flexible refrigerant hose having a corrugated inner tube. The inner tube consists of a plurality of axially spaced concentric non-helical corrugations which provide a high degree of lateral flexibility even with refrigerant hoses of relatively large diameter. The inner tube is formed of a thermoplastic material, preferably nylon.

As nylon is hygroscopic and will attract moisture, a moisture ingression resistant tube of thermoplastic rubber encompasses the nylon inner tube, and in the disclosed embodiment a woven polyester filament yarn reinforcing layer is interposed between the hose corrugated inner tube and the moisture ingression layer. The moisture ingression layer is protected by an outer cover which is formed of a woven fabric, or may be an extruded rubber material or the like.

To ensure maximum lateral flexibility of the hose assembly the inner tube, polyester yarn reinforcing layer, moisture ingression layer formed of thermoplastic rubber and the outer cover, and any other layers that may be used with a hose constructed in accord with the invention, are not bonded or otherwise firmly fixed with respect to the immediately adjacent layers. By not bonding adjacent layers to each other axial displacement between adjacent layers may occur, the high degree of flexibility achieved by the use of the corrugated inner tube is not adversely affected by the reinforcing, moisture ingression resistant and outer cover layers as would be the case in normal multiple layer hose fabrication wherein adjacent layers are bonded together. The lack of a firm bond between adjacent hose layers in accord with the invention permits limited axial displacement between adjacent hose layers during lateral flexing due to the ability of the layer sides opposite each other to contract and expand during flexing. The various hose layers have particular functions, and while the cover layer will restrain the moisture ingression resistance layer from wrinkling during bending, such confinement of one layer within the other does not produce significant resistance to bending in view of the ability of adjacent layers to axially shift relative to each other as needed.

An end fitting is mounted upon the hose end in communication with the hose bore per, hitting the hose to be attached to other components within the refrigeration circuit. In a typical installation the end fitting includes a threaded nut type connector rotatably mounted upon a tubular nipple received within the hose bore at the hose end.

The fitting nipple, in one embodiment, directly engages the innermost diameters of the hose inner tube corrugations. An annular socket surrounds the hose cover in radial alignment with the nipple and is axially fixed with respect to the nipple. The socket may be radially inwardly swaged to compress the hose between the socket and nipple.

Internally, the socket is provided with a plurality of axially spaced inwardly extending serrations, and the axial spacing of the serrations is related to the axial spacing of the hose inner tube corrugations whereby the corrugations will be located intermediate the socket serrations to provide a high friction interconnection between the hose and fitting. In an embodiment of the invention annular resilient sealing rings, such as O-rings, are located within several of the hose inner tube grooves defined by the hose corrugations which are mounted upon the hose nipple. The presence of these elastomeric sealing rings provides support of the inner hose grooves in which they are located causing a sinuous forming of the inner tube and moisture ingression layer effectively related to the socket serrations wherein the annular sealing rings simultaneously improve the sealing between the hose inner tube and nipple, and increase the frictional interconnection between the hose and end fitting.

In another variation of the invention a tubular insert formed of an elastomeric material, such as rubber, includes a smooth cylindrical bore and outer annular circumferential axially spaced ridges of a transverse cross-sectional configuration substantially corresponding to the transverse cross-sectional configuration of the inner tube inner grooves. The insert may be radially deformed to a diameter per, hitting the insert to be placed within the end of the hose so that the insert may expand due to the resiliency of its material and the insert ridges will be received within the inner tube grooves. The insert thereby provides a smooth cylindrical sealing surface for the fitting nipple, and the fitting nipple when used with an insert may be of a smooth cylindrical form. Upon crimping of the socket the insert ridges aid in supporting the inner tube corrugations from collapse due to the socket crimping pressure, the sinuous configuration of the inner tube and other hose layers is maintained due to the presence of the ridges and an effective sealing between the corrugated hose and its end fitting is achieved.

BRIEF DESCRIPTION OF THE DRAWINGS

The aforementioned objects and advantages of the invention will be appreciated from the following description and accompanying drawings wherein:

FIG. 1 is a perspective view of a corrugated refrigeration hose in accord with the invention, the several layers of the hose being cut back to illustrate their construction and relationship to the other hose components, FIG. 2 is an enlarged, detail, elevational sectional view taken through the hose wall of FIG. 1 along Section 2—2 thereof, FIG. 6 is an enlarged detail view of the assembled nipple, hose and socket of the encircled portion indicated in FIG. 5, FIG. 7 is a perspective view of a hose insert used in accord with another embodiment of the invention, FIG. 8 is an exploded elevational, partially sectioned view of the embodiment of the invention utilizing the inner tube insert, prior to the assembly of the components.

DESCRIPTION OF THE PREFERRED EMBODIMENTS

Figure 3:
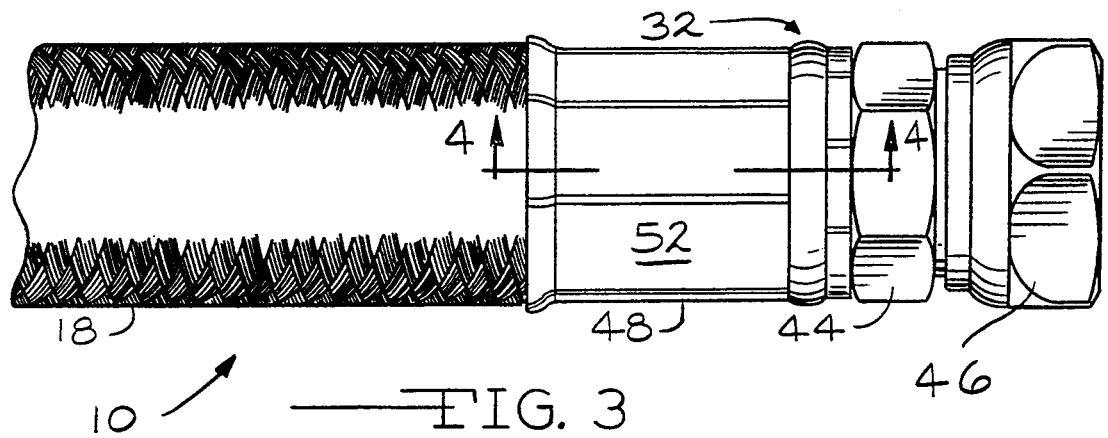
FIG. 3 is a side elevational view of a hose and end fitting as assembled in accord with the invention.

FIG. 1 illustrates a hose 10 in accord with the invention particularly suitable for use with refrigeration and air conditioning circuits for conducting refrigerant gas. The hose 10 is flexible and includes a corrugated inner tube 12 preferably formed of a polyamide material, such as nylon, which has a low refrigerant gas permeation characteristic.

The inner tube 12 is reinforced and protected by the reinforcing layer 14 which surrounds the inner tube 12. The layer 14 may consist of a braided polyester filament such as commonly used with pressurized hose to resist radial expansion. As nylon is hygroscopic and tends to attract moisture a moisture ingression resistant layer 16 surrounds the reinforcing layer 14. The layer 16 preferably comprises a thermoplastic rubber (TPR) which does not require vulcanization. Thermoplastic rubber of the type forming layer 16 is a mixture of polypropylene and rubber and has excellent characteristics with respect to resisting moisture and moisture vapor.

The outer layer of the hose 10 is formed by the cover 18 which could be an extruded rubber, or as illustrated, may be braided of a polyester filament material similar to reinforcing layer 14.

The reinforcing layer 14, moisture ingression resistant layer 16 and cover 18 are each of a flexible characteristic permitting lateral flexibility of the hose, and because of the corrugations defined in the inner tube 12, even relatively large size diameters of hose 10 per, nit the inner tube 12 to have excellent flexibility characteristics for refrigeration circuits.

For the purpose of obtaining the highest degree of lateral flexibility of the assembled hose the filaments of the reinforcing layer 14 do not enter the corrugations of the inner tube 12, and are not bonded to the inner tube 12. Likewise, the moisture ingression resistant layer 16 is not bonded to the reinforcing layer 14 or the cover 18, and it is necessary that axial displacement between the inner tube 12, and the layer 14 take place upon the hose being laterally flexed, and likewise, during such flexing axial displacement between the reinforcing layer 14 and moisture barrier layer 16 may occur, as well as axial displacement between layer 16 and cover 18. If, for purposes of manufacture, it is deemed advisable to locate retention structure, such as an adhesive, between any of the hose layers, or the inner tube 12 and reinforcing layer 14, any such adhesives that are so used must be of a pliable non-hardening type so that the aforementioned axial displacement between the hose layers and inner tube will occur during lateral bending and flexing.

The four layer hose described above can be fabricated on conventional hose manufacturing apparatus. The inner layer 12 is fed through the hose fabricating machine and the reinforcing layer 14 is braided upon the inner tube 12 in a conventional manner wherein the filaments of the layer braid, perferably polyester, are laid upon the outer diameter of the inner tube corrugations as is appreciated from FIG. 2. During braiding of the layer 14 the tension on the filaments is not so great as to cause the filaments to be received within the recesses defined upon the outer surface of the inner tube 12, and only a mechanical frictional interconnection between the filaments of the layer 14 and the inner tube 12 exist.

The moisture ingression layer 16 of the thermoplastic rubber is extruded upon the reinforcing layer 14. The temperature of the thermoplastic rubber is not so high as to cause a mechanical bonding of the layer 16 with the reinforcing layer 14, and the layer 16 will have a substantially uniform wall thickness about the layer 14.

Thereafter, the cover layer 18 is placed upon the moisture ingression resistant layer 16. The cover layer 18 may be formed of braided filaments, as illustrated in FIG. 1, or the cover 18 may consist of rubber which is extruded upon the layer 16. In either instance no bonding takes place between the layers 16 and 18. In the practice of the invention the temperatures of extruded layers are not so high as to cause bonding or a mechanical interconnection between contiguous layers.

In the illustrated hose embodiment a four layer hose construction is illustrated. However, it is to be appreciated that it is within the inventive concepts of the invention that the reinforcing layer 14 could be omitted whereby the moisture ingression resistant layer 16 could be directly laid upon the inner tube 12. Thereupon, a braided cover layer such as 18 would be employed to encompass the moisture ingression layer 16 and the cover would perform the dual purpose of protecting the hose assembly against abrasion, and also prevent outward radial deformation due to internal hose pressure. Likewise, a hose utilizing the inventive concepts could consist of more than four layers. Regardless of the number of layers used to produce the hose assembly, it is to be appreciated that all of the adjacent layers be capable of axial displacement relative to each other so as to minimize resistance to lateral hose flexing or deformation. Of course, the fewer the number of layers the more flexibility available, and as a practical matter the four layer hose illustrated is considered the optimal construction for refrigeration hose utilizing inner tube diameters of ⅜ of an inch to 2 inches.

With particular reference to FIG. 2, it will be appreciated that the nylon inner tube 12 consists of a plurality of axially spaced outer corrugations 20 having inner corrugations 22 located between the outer corrugations. In the disclosed embodiments the corrugations 20 and 22 are concentric to each other and the inner tube axis and are non-helical wherein the inner grooves 24 defined by the outer corrugations 22 do not interconnect. However, it is to be understood that the inventive concepts can be utilized with inner tubes having helical corrugations and both types of corrugated hose are to be included within the scope of the invention. As will be appreciated from FIG. 2, the inner grooves 24 are defined by the lateral edges of the inner corrugations 22 and the outer corrugations define the maximum diameter of the inner tube 12 at the corrugation outer peaks 26.

The innermost portions of the inner corrugations 22 define the hose bore 28, and the end of the inner tube 12 is indicated at 30, FIG. 1. As will be appreciated from FIG. 2, the innermost diameter of the reinforcing layer 14 lays upon the peaks 26, and the radial thickness of the reinforcing layer 14 and cover 16 are substantially equal sandwiching the moisture ingression resistant layer 16 therebetween.

As illustrated in FIG. 3, an end fitting generally indicated at 32 is mounted upon the hose inner tube end 30. The end fitting 32 is of an annular configuration including a nipple 34 having a cylindrical bore 36. The nipple outer surface 38 may be cylindrical and smooth as shown. The nipple further includes a radial shoulder 40 which defines an annular outwardly opening notch 42 adjacent the wrench flats 44 defined on the nipple. A nut 46 is rotatably mounted upon the outer end of the nipple 34 and includes interior threads, not shown, for attaching the end fitting 32 to a threaded adapter or other conduit fitting, not shown, as well known.

The end fitting 32 includes a tubular socket 48 which, at end, is formed to define a lip 50 which is received within the notch 42. The interconnection between the lip 50 and the notch 42 prevents relative radial displacement between the nipple and the socket 48. Preferably, the socket 48 is radially crimped inwardly as represented at 52 to compress the hose 10 between the socket and nipple and provide a sufficient frictional interconnection between the hose and nipple to prevent fitting blow-off, and the crimping also forces the lip 50 into notch 42. The socket 48 includes a plurality of axially spaced inwardly extending annular serrations 54 which are spaced apart a distance substantially corresponding to the axial spacing between the outer corrugations 20, and when inserting the end fitting 32 onto the hose end 30 the hose is related to the fitting nipple 34 such that the outer peaks 26 of the outer corrugations 20 are located intermediate socket serrations 54 as will be appreciated from FIG. 4. The presence of the corrugation peaks 26 intermediate the serrations 54 produces a sinuous configuration of the inner tube 12, reinforcing layer 14, moisture ingression resistant layer 16 and cover 18, and this sinuous form of the hose components significantly adds to the frictional retention and resistance to fitting blow-off achieved.

Figure 4:
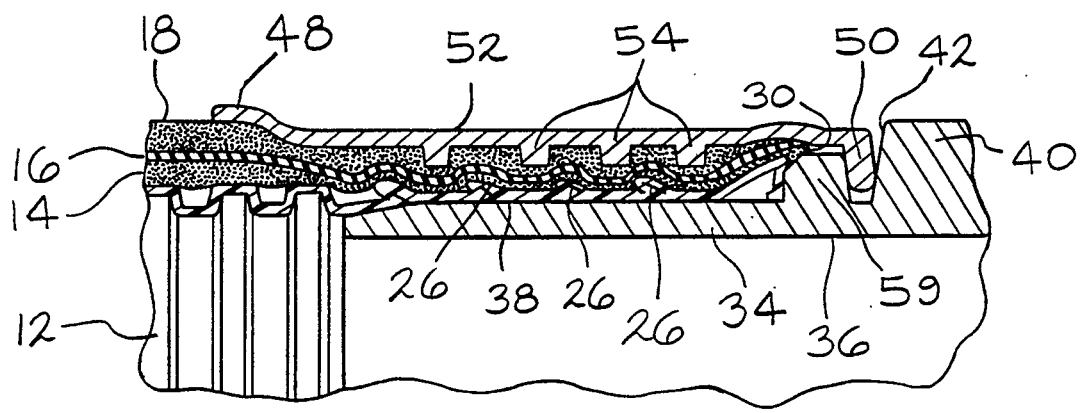
FIG. 4 is a detail, enlarged, elevational sectional view as taken along Section 4—4 of FIG. 3.

As will be appreciated from FIG. 4, the radial forces imposed upon the portion of the hose intermediate the nipple outer surface 38 and the socket 48 tends to radially "crush" the corrugations of the inner tube 12, and the frictional engagement between the nipple and the inner tube 12 as well as the retention forces achieved by the sinuous deforming of the hose layers by the serrations 54 produces an effective mechanical interconnection between the hose and fitting.

Figure 5:
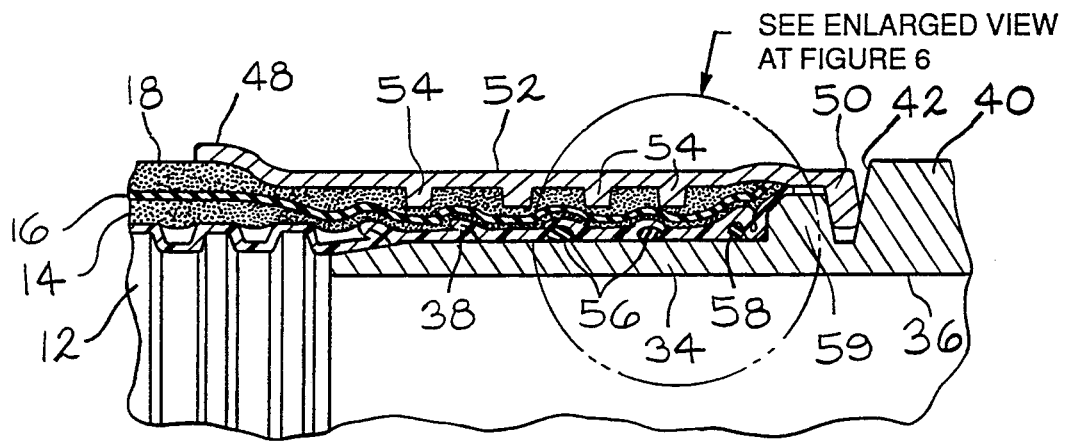
FIG. 5 is an elevational sectional view similar to FIG. 4 illustrating the use of sealing rings as mounted upon the fitting nipple.

A variation in the mounting of the end fitting 32 upon the hose 10 is illustrated in FIGS. 5 and 6. In this version of the invention, a plurality of elastomeric seal rings 56 and 58, such as O-rings, are located within the hose inner grooves 24 adjacent the hose end 30. In the disclosed embodiment two seal rings 56 have been located within the grooves 24. Thereupon, upon inserting the nipple 34 into the hose bore 28 the presence of the seal rings 56, and the right seal ring 58, FIG. 6, improve the fluid tight relationship between the nipple and the inner tube 12.

As best appreciated from FIG. 6, the seal rings 56, upon crimping of the socket 48, will intimately engage with the nipple outer surface 38, and the presence of the seal rings 56 tends to radially deform the hose components intermediate the socket serrations 54 to a greater extent than if the seal rings are not used as described with respect to FIG. 4.

As best illustrated in FIG. 6, the nipple 34 includes a cylindrical surface 60 upon which the right seal ring 58, the ring closest to the hose end 30, will engage, and the nipple abutment 59 includes an oblique surface 62 upon which the end 30 of the inner tube 12 is compressed by the socket 48. As a socket serration 54 is not disposed as close to the proximity of the seal ring 58 as to the seal rings 56 the seal ring 58 will not be deformed to the extent of the O-rings 56 and the typical sealing characteristics of an O-ring will be utilized to provide sealing.

Figure 9:
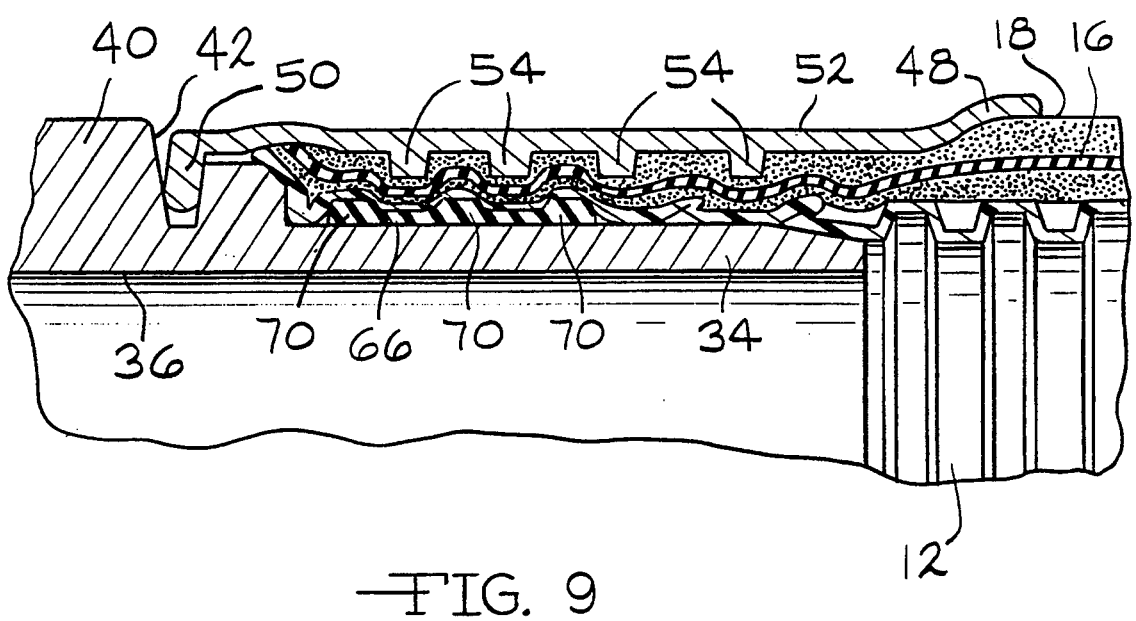
FIG. 9 is a diametrical elevational sectional view of the hose and end fitting embodiment of FIG. 8 as assemmbled.

Another embodiment utilizing the concepts of the invention is illustrated in FIGS. 7-9. In this embodiment, an insert 64 is located within the bore 28 of the inner tube 12 so as to provide the hose with a smooth cylindrical bore configuration to facilitate assembly of the hose 10 and end fitting 32.

The insert 60 comprises a tubular body 66 which is molded of rubber or a polymeric elastic material. The material of the body 66 must be resilient enough to permit the body to be inwardly deformed during installation, as later described.

The insert body 66 includes the cylindrical bore 68, and a plurality, three in the disclosed embodiment, of circumferentially extending ridges 70 are defined upon the outer surface of the body 66. As appreciated from FIG. 8, the transverse cross-sectional configuration of the ridges 70 is substantially equal to the transverse cross-sectional configuration of the inner tube inner grooves 24 adjacent the hose end. Accordingly, by manually radially contracting the body 66 to reduce the diameter thereof, the body 66 may be axially inserted into the hose bore 28 to align the three ridges 70 with the three inner corrugation grooves 24 closest to the inner tube end 30, and the use of the insert 64 now provides the hose 10 with a cylindrical bore adjacent the hose end 30. Of course, if a helical corrugated inner tube is used the ridges 70 will be of a conforming helical configuration.

The fitting nipple 34 is inserted into the insert bore 68 and the use of the insert 64 permits efficient sealing to be achieved between the hose and the end fitting upon crimping of the socket 48.

Further, as the insert ridges 70 will internally partially support the outer corrugations 20 against radial collapse due to the crimping forces imposed upon the socket 48 the ridges 70 provide an effective increase in the frictional forces, and the assurance of the sinuous forming of the hose layers to achieve high frictional retaining forces between the hose and end fitting. It is appreciated that various modifications to the inventive concepts may be apparent to those skilled in the art without departing from the spirit and scope of the invention.

We claim:

1. A hose system characterized by its flexibility and low permeation of gases, such as for refrigerants, comprising, in combination, a hose inner tube having a longitudinal axis said hose inner tube comprising, a wall having inner and outer surfaces, and an end, said inner tube being formed of a thermoplastic material, a plurality of annular corrugations defined on said wall, adjacent corrugations being axially spaced and alternately radially extending in the direction of said inner and outer surfaces, said corrugations radially extending in the direction of said wall outer surface defining axially spaced annular grooves within said inner tube, a reinforcing layer tube closely encompassing said inner tube radially located outwardly of said grooves and unbonded with respect to said inner tube and axially displaceable thereto, a flexible continuous wall tube of moisture ingression resistant material extruded upon and circumscribing said reinforcing layer tube and being unbonded with respect to said reinforcing layer tube and a flexible tubular outer cover circumscribing said continuous wall tube, said outer cover being unbonded with respect to said continuous wall tube and all of said tubes and outer cover being axially displaceable with respect to each other and axially displaceable with respect to each other during lateral deflection of the hose system assembly.

2. In a hose system as in claim 1, said inner tube being formed on nylon.

3. In a hose system as in claim 2, said continuous wall tube of moisture ingression resistant material being formed of thermoplastic rubber.

4. In a hose system as in claim 1, a fitting mounted upon said inner tube end, said fitting including a tubular nipple inserted within said tube end having an outer surface, a tubular socket spaced from said nipple in radial alignment therewith having an inner surface engaging said cover upon said nipple being inserted into said inner tube end, interlocking means defined on said nipple and socket preventing relative axial movement therebetween, conduit connection means defined upon said fitting, said socket being inwardly deformed toward said nipple, and retaining means located intermediate said nipple and socket frictionally retaining said inner tube upon said nipple.

5. In a hose system as in claim 4, said retaining means including annular inwardly radially extending axially spaced serrations defined on said socket inner surface adjacent serrations being axially spaced from each other a distance substantially corresponding to the axial spacing of adjacent inner tube grooves, the hose corrugations radially extending in the direction of said inner tube outer surface being axially aligned intermediate said socket serrations to increase the frictional retention of said inner tube intermediate said nipple and said socket.

6. In a hose system as in claim 5, said retaining means including at least one elastomeric annular seal ring within at least one of said inner tube annular grooves located upon said nipple outer surface whereby compression of said seal ring intermediate said nipple and socket aids in sealing said inner tube to said nipple and aids in radially deforming said inner tube corrugations intermediate said socket serrations.

7. In a hose system as in claim 6, an elastomeric seal ring within at least two adjacent inner tube annular grooves located upon said nipple.

8. In a hose system as in claim 7, a radial outward extending abutment defined on said fitting between said nipple and said conduit connection means, a cylindrical surface defined on said nipple adjacent said abutment, an annular conical compression surface defined on said abutment disposed toward said socket, an annular elastomeric seal ring located within said inner tube groove adjacent said inner tube end engaging said cylindrical surface, said inner tube end engaging said conical surface and being compressed thereon by said socket.

9. In a hose system as in claim 5, an annular insert located within said inner tube end having inner and outer surfaces and mounted upon said nipple, said insert having at least one annular circumferential ridge defined upon said insert outer surface substantially corresponding in configuration to and received within an inner tube groove, said insert and ridge aiding in maintaining the associated inner tube groove intermediate the associated adjacent socket serrations.

10. In a hose system as in claim 7, said insert being formed of a deformable elastomeric material, a plurality of axially spaced ridges defined upon said insert outer surface, adjacent ridges being axially spaced a distance equal to the axial spacing of adjacent inner tube grooves.

11. A hose system characterized by its flexibility and low permeation of gases, such as for refrigerants, comprising, in combination, a hose inner tube having a longitudinal axis said hose inner tube comprising, a wall having inner and outer surfaces, and an end, said inner tube being formed of a thermoplastic material, a plurality of annular corrugations defined on said wall, adjacent corrugations being axially spaced and alternately radially extending in the direction of said inner and outer surfaces, said corrugations radially extending in the direction of said wall outer surface defining axially spaced annular grooves within said inner tube, a flexible outer cover circumscribing said inner tube and an intermediate continuous wall tube of flexible moisture ingression resistant material extruded upon and circumscribing said inner tube located between said inner tube and said outer cover, said inner tube being unbonded with respect to said intermediate tube and said outer cover being unbonded with respect to said intermediate tube and all of said tubes and outer cover being axially displaceable with respect to each other and axially displaceable with respect to each other during lateral deflection of the hose system assembly.

* * * * *